United States Patent Office 3,636,029
Patented Jan. 18, 1972

3,636,029
CATALYTIC CARBONYLATION OF NITRO COMPOUNDS TO PREPARE ISOCYANATES
Eric Smith, Madison, Conn., assignor to Olin Corporation
No Drawing. Filed Mar. 1, 1968, Ser. No. 709,819
Int. Cl. B01j *11/78;* C07c *119/04*
Int. Cl. 260—453 PC
14 Claims

ABSTRACT OF THE DISCLOSURE

The process for preparing an organic isocyanate by reacting an organic nitro compound with carbon monoxide in the presence of a catalyst system comprised of a mixture of an oxygen-containing sulfur compound and a halide of a noble metal. The oxygen-containing sulfur compounds include organic sulfites, organic sulfoxides, organic sulfones, and alkali metal sulfites, and derivatives thereof. Tetramethylene sulfoxide, sodium sulfite, and dibenzothiophene sulfone represent some of the preferred oxygen-containing sulfur compounds. The noble metal halide is preferably a halide of palladium, rhodium, iridium, platinum, or mixtures thereof. The catalyst system may also include a third component such as molybdenum trioxide or another metal oxide.

---

This invention relates to catalytic systems useful in the preparation of organic isocyanates from organic nitro compounds.

Organic isocyanates are used extensively in the preparation of urethane foams, coatings, and fibers, as well as in the preparation of insecticides, pesticides and the like. Commercial processes for preparing organic isocyanates utilize the catalytic hydrogenation of an organic nitro compound to form the corresponding amine, followed by reaction of the amine with phosgene to form the corresponding isocyanate. These processes are complex and expensive, and the need for a simplified, less expensive process is apparent.

In order to provide a simplified technique, it has been proposed to react an organic nitro compound with carbon monoxide in the presence of a catalyst. For example, British Pat. No. 1,025,436 discloses a process for preparing isocyanates from the corresponding nitro compounds by reacting an organic nitro compound with carbon monoxide in the presence of a noble metal-based catalyst. This process is not used commercially, because no more than trace amounts of organic isocyanates are formed when an organic nitro compound such as dinitrotoluene is reacted with carbon monoxide using a noble metal-based catalyst, such as palladium dichloride, iridium trichloride, osmium trichloride and the like.

Other proposed simplified techniques utilize other catalyst systems. For example, Belgian Pat. No. 672,405 entitled "Process for the Preparation of Organic Isocyanates," describes the use of a catalyst system of a noble metal and/or a Lewis acid in the reaction between an organic nitro compound with carbon monoxide.

Unfortunately, the yield of organic isocyanate afforded by these simplified techniques has not been significant enough to justify their use on a commercial scale.

It is a primary object of this invention to provide an improved process for the preparation of organic isocyanates.

Another object of the invention is to provide a novel catalyst system useful in the direct conversion of organic nitro compounds to the corresponding organic isocyanates.

Still a further object is to provide an improved process for preparing aromatic isocyanates such as phenyl isocyanate, toluene diisocyanates, and isocyanato-nitrotoluenes.

These and other objects of the invention will be apparent from the following detailed description thereof.

It has now been discovered that the above-mentioned objects are accomplished when an organic nitro compound is reacted with carbon monoxide at an elevated pressure and elevated temperature in the presence of a catalyst system comprised of (I) A mixture of:
  (A) At least one oxygen-containing sulfur compound having a formula selected from the group consisting of
    (1)         $RS_m(O)_nR'$ where R and R' are each a monovalent moiety selected from the group consisting of (a) alkyl, (b) aryl, (c) alkoxyaryl, (d) halogenated aryl, (e) alkoxy, (f) aryloxy, and (g) alkali metal oxy (NaO—), and (2)     $\lfloor R''S_m(O)_n \rfloor$ where R" is a cyclic moiety selected from the group consisting of (a) alkylene, (b) alkylene dioxy, (c) diarylene, (d) 2,2'-biphenylene, (e) alkylene oxy,
    (3) where $m$ is a number in the range between 1 and 3 and $n$ is a number in the range between about 1 and $2m$,
  (B) at least one halide of a noble metal, or
(II) a complex of a compound of IA and a halide of IB.

In R and R' above, alkyl and alkoxy contain between 1 and 8 carbon atoms, including methyl to octyl. The aryl and aryloxy moieties contain between 6 and 12 carbon atoms, such as phenyl, cresyl, naphthyl, xylyl, and the like. The organic moieties referred to above may also contain halogen substituents such as chlorine, bromine, iodine and the like. The alkali metals include sodium, lithium and potassium. In R" above, alkylene contains between 4 and 7 carbon atoms, and arylene and phenylene contain between 6 and 12 carbon atoms. Oxygen-containing sulfur compounds include alkali metal and organic sulfites and thiosulfates, organic sulfoxides, organic sulfones, organic thiolsulfinates, organic thiolsulfonates, organic sulfinyl sulfones, organic α-disulfones, esters of sulfonic acids, mixtures thereof and the like.

Any organic nitro compound capable of being converted to an organic isocyanate may be employed as a reactant. Generally, aromatic, cycloaliphatic, and aliphatic mono- or poly-nitro compounds, which may be substituted, if desired, can be reacted to form the corresponding mono- or poly-isocyanates by the novel process of this invention. The term "organic nitro compound," is used throughout the description and claims to define unsubstituted as well as substituted organic nitro compounds of the type described herein. Typical examples of suitable organic nitro compounds which can be reacted to form isocyanates include the following:

(I) Aromatic nitro compounds (a) Nitrobenzene
(b) Nitronaphthalenes
(c) Nitroanthracenes
(d) Nitrobiphenyls
(e) Bis(nitrophenyl)methanes
(f) Bis(nitrophenyl)ethers
(g) Bis(nitrophenyl)thioether
(h) Bis(nitrophenyl)sulfones
(i) Nitrodiphenoxy alkanes
(j) Nitrophenothiazines (II) Nitrocycloalkanes
(a) Nitrocyclobutane
(b) Nitrocyclopentane
(c) Nitrocyclohexane
(d) Dinitrocyclohexanes
(e) Bis(nitrocyclohexyl)methanes (III) Nitroalkanes
(a) Nitromethane
(b) Nitroethane
(c) Nitropropane
(d) Nitrobutanes
(e) Nitrohexanes
(f) Nitrooctanes
(g) Nitrooctadecanes
(h) Dinitroethane
(i) Dinitropropanes
(j) Dinitrobutanes
(k) Dinitrohexanes
(l) Dinitrodecanes
(m) Phenyl nitromethane
(n) Bromophenyl nitromethanes
(o) Nitrophenyl nitromethanes
(p) Methoxy phenyl nitromethanes
(q) Bis-(nitromethyl)cyclohexanes
(r) Bis-(nitromethyl)benzenes All of the aforementioned compounds may be substituted with one or more additional substituents such as nitro, nitro-alkyl, alkyl, alkenyl, alkoxy, aryloxy, halogen, alkylthio, arylthio, carboxyalkyl, cyano, isocyanato, and the like, and employed as reactants in the novel process of this invention. Specific examples of suitable substituted-organic nitro compounds which can be used are as follows:

(1) o-Nitrotoluene
(2) m-Nitrotoluene
(3) p-Nitrotoluene
(4) o-Nitro-p-xylene
(5) 2-Methyl-1-nitronaphthalene
(6) m-Dinitrobenzene
(7) p-Dinitrobenzene
(8) 2,4-Dinitrotoluene
(9) 2,6-Dinitrotoluene
(10) Dinitromesitylene
(11) 4,4'-Dinitrobiphenyl
(12) 2,4-Dinitrobiphenyl
(13) 4,4'-Dinitrodibenzyl
(14) Bis(p-nitrophenyl)methane
(15) Bis(2,4-dinitrophenyl)methane
(16) Bis(p-nitrophenyl)ether
(17) Bis(2,4-dinitrophenyl)ether
(18) Bis(p-nitrophenyl)thioether
(19) Bis(p-nitrophenyl)sulfone
(20) Bis(p-nitrophenoxy)ethane
(21) α,α'-Dinitro-p-xylene
(22) 2,4,6-Trinitrotoluene
(23) 1,3,5-Trinitrobenzene
(24) 1-chloro-2-nitrobenzene
(25) 1-chloro-4-nitrobenzene
(26) 1-chloro-3-nitrobenzene
(27) 2-chloro-6-nitrotoluene
(28) 4-chloro-3-nitrotoluene
(29) 1-chloro-2,4-dinitrobenzene
(30) 1,4-dichloro-2-nitrobenzene
(31) alpha-Chloro-p-nitrotoluene
(32) 1,3,5-trichloro-2-nitrobenzene
(33) 1,3,5-trichloro-2,4-dinitrobenzene
(34) 1,2-dichloro-4-nitrobenzene
(35) alpha-Chloro-m-nitrotoluene
(36) 1,2,4-trichloro-5-nitrobenzene
(37) 1-bromo-4-nitrobenzene
(38) 1-bromo-2-nitrobenzene
(39) 1-bromo-3-nitrobenzene
(40) 1-bromo-2,4-dinitrobenzene
(41) α,α-Dibromo-p-nitrotoluene
(42) α-Bromo-p-nitrotoluene
(43) 1-fluoro-4-nitrobenzene
(44) 1-fluoro-2,4-dinitrobenzene
(45) 1-fluoro-2-nitrobenzene
(46) o-Nitrophenyl isocyanate
(47) m-Nitrophenyl isocyanate
(48) p-Nitrophenyl isocyanate
(49) o-Nitroanisole
(50) p-Nitroanisole
(51) p-Nitrophenetole
(52) o-Nitrophenetole
(53) 2,4-dinitrophenetole
(54) 2,4-dinitroanisole
(55) 1-chloro-2,4-dimethoxy-5-nitrobenzene
(56) 1,4-dimethoxy-2-nitrobenzene
(57) m-Nitrobenzaldehyde
(58) p-Nitrobenzaldehyde
(59) p-Nitrobenzoylchloride
(60) m-Nitrobenzoylchloride
(61) 3,5-dinitrobenzoylchloride
(62) Ethyl-p-nitrobenzoate
(63) Methyl-o-nitrobenzoate
(64) m-Nitrobenzenesulfonylchloride
(65) p-Nitrobenzenesulfonylchloride
(66) o-Nitrobenzenesulfonylchloride
(67) 4-chloro-3-nitrobenzenesulfonylchloride
(68) 2,4-dinitrobenzenesulfonylchloride
(69) 3-nitrophthalic anhydride
(70) p-Nitrobenzonitrile
(71) m-Nitrobenzonitrile
(72) 1,4-dinitrocyclohexane
(73) Bis(p-nitrocyclohexyl)methane
(74) 1-nitro-n-hexane
(75) 2,2-dimethyl-1-nitrobutane
(76) 1,6-dinitro-n-hexane
(77) -1,4-bis(nitromethyl)cyclohexane
(78) 3,3'-dimethoxy-4,4'-dinitro-biphenyl
(79) 3,3'-dimethyl-4,4'-dinitro-bisphenyl In addition, isomers and mixtures of the aforesaid organic nitro compounds and substituted organic nitro compounds may also be employed, as well as homologues and other related compounds. Compounds which have both nitro and isocyanato substituents, such as 2-isocyanato-4-nitrotoluene, may also be employed as a reactant.

The process of this invention is particularly effective in the conversion of aromatic nitro compounds to organic isocyanates. As used herein, the term "aromatic nitro compounds" represents those aromatic nitro compounds having at least one nitro group attached directly to an aromatic hydrocarbon nucleus, such as benzene, naphthlene, and the like, wherein the aromatic hydrocarbon nucleus may be substituted as illustrated above. Among the preferred organic nitro compounds which may be used in the practice of this invention are the nitrobenzenes, both mono- and poly-nitro, including isomeric mixtures thereof; the nitroalkylbenzenes, including the various nitrated toluenes and the nitrated xylenes; nitrated biphenyl and nitrated diphenylmethylene. Other preferred reactants include bis(nitrophenoxy)alkylenes and bis(nitrophenoxy)alkyl ethers. Generally, the organic nitro compounds and substituted organic nitro compounds contain between 1 and about 20 carbon atoms, and preferably between about 6 and about 15 carbon atoms.

The catalyst system of this invention is a mixture or complex of at least one oxygen-containing sulfur compound with at least one noble metal halide.

As indicated previously, suitable oxygen-containing sulfur compounds are those having the formula selected from the group consisting of $RS_m(O_n)R'$ and $$\left[R''S_m(O_n)\right]$$

where R, R', and R", m and n are as defined above.

Typical compounds represented by the formula $RS_m(O_n)R'$ include the following:

(1) Where m equals 1 and n equals 1:
(a) dimethyl sulfoxide
(b) sodium sulfite
(c) diphenyl sulfoxide
(d) p-tolyl sulfoxide
(e) 4-chlorophenyl sulfoxide
(f) p-methoxyphenyl sulfoxide
(g) diethyl sulfite
(h) diphenyl sulfite
(i) potassium sulfite
(j) lithium sulfite (2) Where m equals 2 and n equals 1:
(a) sodium thiosulfate
(b) potassium thiosulfate
(c) lithium thiosulfate (3) Where m equals 2 and n equals 2:
(a) phenyl methyl thiosulfonate
(b) diphenyl thiosulfonate
(c) p-methyl phenyl-phenyl thiosulfonate
(d) p-chlorophenyl-phenyl thiosulfonate
(e) di(p-methoxyphenyl) thiosulfonate (4) Where m equals 1 and n equals 2:
(a) dimethyl sulfone
(b) diethyl sulfone
(c) diphenyl sulfone
(d) di-p-tolyl sulfone
(e) di-p-methoxyphenyl sulfone
(f) di-isopropyl sulfone
(g) phenyl methyl sulfone
(h) p-tolyl methyl sulfone
(i) p-methoxyphenyl methyl sulfone
(j) 4,4'-dibromodiphenyl sulfone
(k) mesityl phenyl sulfone
(l) dimesityl sulfone
(m) bis(nitrophenyl)sulfone Typical compounds represented by the formula

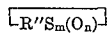

are as follows:

(1) tetramethylene sulfoxide
(2) pentamethylene sulfoxide
(3) dibenzothiophene sulfoxide
(4) tetramethylene sulfite
(5) tetramethylene sulfite
(6) ethylene sulfite
(7) dibenzothiophene sulfone
(8) tetramethylene sulfone Other typical compounds represented by the above formulas are found in Sulfur Bonding, by Charles C. Price and Shigeru Oae, The Ronald Press Company, New York, 1962. Other typical compounds include sulfoxides and sulfones of the heteroaromatic sulfur compounds described in my copending application entitled "Catalytic System Containing Heteroaromatic Sulfur Compound Useful in Isocyanate Process." In addition, the thiolsulfinates, thiolsulfonates, sulfinyl sulfones, and α-disulfones corresponding to the aforesaid typical compounds may also be used. Furthermore, esters of sulfonic acids such as alkyl benzene sulfonate, methyl benzene sulfonate, and alkoxy aryl sulfonates and the like, may be used.

When the organic nitro compound reactant also contains as oxygen-containing sulfur moiety, such as bis-(nitrophenyl)sulfones, it is preferred to utilize an oxygen-containing sulfur compound as a component of the catalyst system which is free of nitro substituents.

The second component of the catalyst system is at least one halide of a noble metal capable of forming a complex with the oxygen-containing sulfur compound described above. Noble metals include ruthenium, rhodium, palladium, osmium rhenium, iridium, platinum, silver and gold. It is preferred that the metal be one of the platinum series, including a metal selected from the group consisting of halides of palladium, rhodium, platinum, iridium, and mixtures thereof. Typical examples of suitable halides include palladous dibromide, palladous dichloride, palladous difluoride, palladous diiodide, rhodium tribromide, rhodium trichloride, rhodium trifluoride, rhodium triiodide; platinic bromide, platinous bromide, platinic chloride, platinous chloride, platinic fluoride, platinous iodide, platinic iodide, rhenium trichloride, rhenium tetrachloride, rhenium tetrafluoride, rhenium hexafluoride, rhenium tribromide, iridium tribromide, iridium tetrabromide, iridium dichloride, iridium trichloride, iridium tetrachloride, iridium triiodide, iridium tetraiodide, and mixtures thereof. Oxides of the noble metals may also be employed and the term "halide of a metal" is used throughout the description and claims is intended to include the above mentioned metal halides as well as the corresponding oxides, such as palladium oxide, rhodium oxide, platinum oxide, and the like.

The oxygen-containing sulfur compound and the metal halide may each be added separately to the organic nitro compound reactant, or if desired, may be premixed prior to adding to the organic nitro compound. When it is desired to utilize complexes of the oxygen-containing sulfur compound and metal halide, the components may be first reacted in a suitable solvent such as monochlorobenzene, ethanol, or an excess of the oxygen-containing sulfur compound to form an organic metal halide complex, which is then isolated as a crystalline solid and added to the reaction mixture. For example, dimethyl sulfoxide may be reacted with palladous dichloride in anhydrous organic media to form a complex of the structural formula:

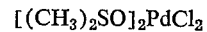

Other above specified oxygen-containing sulfur compounds may also be used to form corresponding organic metal halide complexes with the aforesaid metal halides for use as a catalyst in the invention. Other suitable complexes and other techniques for preparing the complexes of the oxygen-containing sulfur compounds and halides of a noble metal selected from the group consisting of palladium, rhodium, iridium and platinum are found in the following papers:

(1) "Reactions of Tetramethylene Sulfoxide With Copper (II) and Palladium (II) Halides" by Deven W. Meek et al., Inorganic Chemistry, vol. 3, No. 11, Nov., 1964, pp. 1637–8.

(2) "Complexes of Tetrahydrothiophen Oxide," by Ronald Francis and F. Albert Cotton, Journal of the Chemical Society, 1961, pp. 2078–81.

(3) "Sulfoxides as Ligands. (I) Preliminary Survey of Methyl Sulfoxide Complexes" by F. A. Cotton and R. Francis, Journal of the American Chemical Society, vol. 82, (1960) pp. 2986–91.

Although all of the aforesaid catalyst systems have some effect on improving the yield of isocyanate, certain systems are significantly more effective than others. Included in these more effective systems are mixtures and/or complexes of the noble metal halides with the following oxygen-containing sulfur compounds:

(1) Dimethyl sulfoxide
(2) Tetramethylene sulfoxide
(3) Diphenyl sulfoxide
(4) Chlorophenyl sulfoxide
(5) Tolyl sulfoxide
(6) Dimethyl sulfone
(7) Diphenyl sulfone
(8) Sodium sulfite
(9) Sodium thiosulfate
(10) Dibenzothiophene sulfone The catalyst system can be self-supported or deposited on a support or carrier for dispersing the catalyst system to increase its effective surface. Alumina, silica, carbon, barium sulfate, calcium carbonate, asbestos, bentonite, diatomaceous earth, fuller's earth, and analogous materials are useful as carriers for this purpose.

The reaction is carried out in the presence of a catalytic proportion of the catalyst system. The proportion of catalyst system is generally equivalent to between about 0.001 and about 500 percent, and preferably between about 1 and about 100 percent by weight of the organic nitro compound. However, greater or lesser proportions may be employed if desired.

The molar ratio o fthe oxygen-containing sulfur compound to the anion of the noble metal halide is generally between about 0.1:1 and about 10:1, and preferably between about 0.5:1 and about 1.5:1, but greater or lesser ratios may be employed if desired.

The process of this invention operates effectively in the absence of a solvent, but improved overall yields of the organic isocyanates can be obtained when a solvent which is chemically inert to the components of the reaction system is employed. Suitable solvents include aliphatic cycloaliphatic and aromatic solvents such as n-heptane, cyclohexane, benzene, toluene, and xylene, and halogenated aliphatic and aromatic hydrocarbons such as dichloromethane, tetrachloromethane, trichlorotrifluoroethane, monochloronaphthalene, monochlorobenzene, dichlorobenzene, trichlorobenzene, and perchloroethylene, as well as sulfur dioxide, organic oxygen-containing sulfur compounds of the type described above having a boiling point higher than the nitro reactant or isocyanate product, mixtures thereof and the like.

The proportion of solvent is not critical and any proportion may be employed which will not require excessively large equipment to contain. Generally the weight percent of organic nitro compound in the solvent is in the range between about 5.0 and about 75 percent, but greater or lesser proportions may be employed if desired.

The order of mixing the reactants is not critical and may be varied within the limitations of the equipment employed. In one embodiment, the organic nitro compound, catalyst system, and if desired, solvent, is charged to a suitable pressure vessel such as an autoclave which was previously purged with nitrogen, and which is preferably provided with agitation means such as a stirrer or an external rocking mechanism. At start-up, carbon monoxide is fed into the autoclave until a pressure is attained, at ambient temperature which is generally between about 30 and about 10,000 p.s.i.g. After the reaction proceeds and heat is applied, the pressure may increase to as high as 30,000 p.s.i.g. The preferred reaction pressure is between about 100 and about 20,000 p.s.i.g. However, greater or lesser pressures may be employed if desired.

Generally the quantity of carbon monoxide in the free space of the reactor is sufficient to maintain the desired pressure as well as provide reactant for the process, as the reaction progresses. If desired, additional carbon monoxide can be fed to the reactor either intermittently or continuously as the reaction progresses. The reaction is believed to progress in accordance with the following equation:

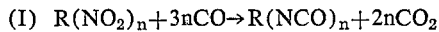

(I) $R(NO_2)_n + 3nCO \rightarrow R(NCO)_n + 2nCO_2$ where R is the organic moiety of the organic nitro compound reactant of the type defined above, and $n$ is the number of nitro groups in the organic nitro compound. The total amount of carbon monoxide added during the reaction is generally between about 3 and about 50 and preferably between about 8 and about 15 moles of carbon monoxide per nitro group in the organic nitro compound. Greater or lesser amounts may be employed if desired. The highest carbon monoxide requirements are generally utilized in a process in which the carbon monoxide is added continuously, but suitable recycle of the carbon monoxide containing gas streams greatly reduces the overall consumption of carbon monoxide.

The reaction temperature is generally maintained above about 25° C. and preferably between about 100 and about 250° C. Interior and/or exterior heating and cooling means may be employed to maintain the temperature within the reactor within the desired range.

The reaction time is dependent upon the organic nitro compound being reacted, temperautre, pressure, and on the amount of catalyst being charged, as well as the type of equipment being employed. Usually between one-half hour and 20 hours are required to obtain the desired degree of reaction, in a batch technique, but shorter or longer reaction times may be employed. In a continuous process, the reaction may be much lower, i.e., substantially instantaneous, and residence time may be substantially less than batch reaction time.

The reaction can be carried out batchwise, semicontinuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the catalyst from the reaction product, and fractional distillation is preferably employed to isolate the organic isocyanate from the reaction product. However, other suitable separation techniques such as extraction, sublimation, etc., may be employed to separate the organic isocyanate from the unreacted organic nitro compound and any by-products that may be formed.

Organic isocyanates produced in accordance with the technique of this invention are suitable for use in preparing polyurethane compositions such as foams, coatings, fibers, and the like by reacting the organic isocyanate with a suitable polyether polyol in the presence of a catalyst and, if desired, a foaming agent. In addition, the organic isocyanates may be used in the preparation of biologically active compounds.

Some improvement in the conversion and yield of organic isocyanates can be obtained by employing a catalyst system which not only contains a mixture or complex of the aforesaid oxygen-containing compound of sulfur and noble metal halide, but also contains a third component comprised of certain metal oxides. Oxides suitable as a third component of the catalyst system include at least one oxide of an element selected from the group consisting of vanadium, molybdenum, tungsten, niobium, chromium and tantalum, as described in co-pending application Ser. No. 619,158, filed Feb. 28, 1967, for Process, by Wilhelm J. Schnabel, Ehrenfried H. Kober and Theodore C. Kraus. These elements are found in Groups V–B and VI–B of the Periodic Table. Suitable oxides of this type include chromic oxide ($Cr_2O_3$), chromium dioxide ($CrO_2$), and chromous oxide (CrO); molybdenum sesquioxide ($Mo_2O_3$), molybdenum dioxide ($MoO_2$), and molybdenum trioxide ($MoO_3$); niobium monoxide (NbO), niobium oxide ($NbO_2$), and niobium pentoxide ($Nb_2O_5$); tantalum dioxide ($Ta_2O_2$), tantalum tetraoxide ($Ta_2O_4$), and tantalum pentoxide ($Ta_2O_5$); tungstic oxide ($WO_2$), and tungstic trioxide ($WO_3$); vanadium dioxide ($V_2O_2$), vanadium trioxide ($V_2O_3$), vanadium tetraoxide ($V_2O_4$) and vanadium pentoxide ($V_2O_5$). Mixtures of two or more of these oxides may be employed as one component of the catalyst mixture. The proportion of the third component of the catalyst system when one is employed, is generally equivalent to a weight ratio of the Group VIII metal compound to the metal oxide in the catalyst system generally in the range between about 0.0001:1 and about 25:1, and preferably in the range between about 0.005:1 and about 5:1.

The following examples are presented to describe the invention more fully without any intention of being limited thereby. All parts and percentages are by weight unless otherwise specified.

EXAMPLES 1–12

In these examples, the procedure included charging 2,4-dinitrotoluene (5.0 grams) and the catalyst mixture indicated to a clean, 100 ml. stainless steel autoclave (316 grade) together with orthodichlorobenzene solvent (5 ml.). The proportion of noble metal halide was 8% of the dinitrotoluene, and the molar ratio of oxygen-containing sulfur compound to noble metal halide was 3:1 unless otherwise indicated.

The autoclave was sealed after being so charged, then pressured with nitrogen and tested for leaks. Nitrogen was released and the autoclave was pressured with carbon monoxide to about 2500 p.s.i.g. During the reaction the autoclave was rocked in a rocker (36 cycles per minute), and heated during one hour to 190° C., when the internal pressure rose to about 3800 p.s.i.g. This temperature was maintained for three hours, and then reduced to ambient temperature. After venting, the contents were discharged and weighed, and the autoclave was rinsed with two 5 ml. portions of orthodichlorobenzene. Insoluble matter present (unreacted catalyst or solids formed during the reaction) was filtered from the reaction mixture and washed with dichlorobenzene, and then ether. The wash solutions were combined with the filtrate and the resulting solution was subjected to a determination of its infrared spectrum to test for the presence of isocyanates (which possess a characteristic infrared light absorption at about 4.5 microns). The filtrate was also subjected to analysis by vapor phase chromatography, to determine the weight percentage of 2,4-dinitrotoluene, 2,4-toluene diisocyanate, 2-isocyanato-4-nitrotoluene and 4-isocyanato-2-nitrotoluene present. The conversion of 2,4-dinitrotoluene was calculated. The yield of 2,4-toluene diisocyanate and the combined yield of mononitrotolyl isocyanates was calculated and then corrected for the amount of 2,4-dinitrotoluene, if any, which had been recovered.

| Example | Catalyst system | Percent conversion | 2,4-TDI[d] | Total isocyanate |
|---|---|---|---|---|
| 1 | $RhCl_3$ plus dimethyl sulfoxide. | 40 | 4 | 22 |
| 2 | $RhCl_3$ plus tetramethylene sulfoxide. | 93 | 8 | 19 |
| 3 [a] | $PdCl_2$ plus diphenyl sulfoxide. | 67 | 0 | 14 |
| 4 [b] | $RhCl_3$ plus 4-chlorpheny sulfoxide. | 17 | 0 | 21 |
| 5 [b] | $PdCl_2$ minus 4-chlorpheny sulfoxide. | 38 | 0 | 17 |
| 6 [b] | $RhCl_3$ plus p-tolyl sulfoxide. | 10 | 0 | 55 |
| 7 [c] | $RhCl_3$ plus dimethyl sulfone. | 65 | 4 | 37 |
| 8 [c] | $PdCl_2$ plus diphenyl sulfone. | 54 | 1 | 28 |
| 9 [a] | $RhCl_3$ plus diphenyl sulfone. | 94 | 5 | 26 |
| 10 | $PdCl_2$ plus sodium sulfite. | 21 | 0 | 28 |
| 11 | $PdCl_2$ plus sodium thiosulfate. | 17 | 0 | 10 |
| 12 | $RhCl_3$ plus dibenzothiophene sulfone. | 29 | 3 | 72 |

[a] Molar ratio of sulfur compound to noble metal compound of 2:1
[b] 10% by weight of noble metal compound.
[c] Molar ratio of sulfur compound to noble metal compound of 1:1
[d] 2,4-toluene diisocyanate.

For purposes of comparison a procedure similar to Examples 1–12 was employed except that the catalyst was solely $PdCl_2$ or solely $RhCl_3$. Only a trace of isocyanate could be detected in each instance.

Various modifications of the invention, some of which have been referred to above, may be employed without departing from the spirit of the invention.

What is desired to be secured by Letters Patent is:

1. In the process for preparing an aromatic isocyanate by reacting an aromatic nitro compound with carbon monoxide at an elevated temperature and an elevated pressure in the presence of a catalyst, the improvement which comprises employing as said catalyst a catalyst system comprised of
   (I) a mixture of
      (A) an oxygen-containing sulfur compound selected from the group consisting of
         (1) dimethyl sulfoxide
         (2) tetramethylene sulfoxide
         (3) diphenyl sulfoxide
         (4) chlorophenyl sulfoxide
         (5) tolyl sulfoxide
         (6) dimethyl sulfone
         (7) diphenyl sulfone
         (8) sodium sulfite
         (9) sodium thiosulfate and
         (10) dibenzothiophene sulfone
      (B) a halide of a metal selected from the group consisting of
         (1) palladium
         (2) rhodium
         (3) iridium
         (4) platinum
         (5) ruthenium
         (6) rhenium, and
         (7) mixtures thereof, or
   (II) a complex of a compund of IA and a halide of IB,
   (III) wherein the molar ratio of said oxygen-containing sulfur compound to the anion of said halide is in the range between about 0.1:1 and about 10:1, and
   (IV) wherein the proportion of said catalyst system is between about 0.001 and about 500 weight percent of said aromatic nitro compound.

2. The process of claim 1 wherein the molar ratio of said oxygen-containing sulfur compound to the anion of said metal halide is in the range between about 0.5:1 and about 1.5:1.

3. The process of claim 2 wherein the proportion of said catalyst system is between about 1 and about 100 weight percent of said aromatic nitro compound.

4. The process of claim 3 wherein said noble metal halide is selected from the group consisting of palladous dichloride, rhodium trichloride, iridium trichloride, rhenium trichloride, platinum tetrachloride and mixtures thereof.

5. The process of claim 4 wherein said aromatic nitro compound is selected from the group consisting of nitrobenzene and dinitrotoluene.

6. The process of claim 5 wherein said metal oxide is selected from the group consisting of chromic oxide ($Cr_2O_3$), chromium dioxide ($CrO_2$), chromous oxide (CrO), molybdenum sesquioxide ($Mo_2O_3$), molybdenum dioxide ($MoO_2$), molybdenum trioxide ($MoO_3$), niobium monoxide (NbO), niobium oxide ($NbO_2$), niobium pentoxide ($Nb_2O_5$) tantalum dioxide ($Ta_2O_2$), tantalum tetraoxide ($Ta_2O_4$), tantalum pentoxide ($Ta_2O_5$) tungstic oxide ($WO_2$), tungstic trioxide ($WO_3$), vandium dioxide ($V_2O_2$), vanadium trioxide ($V_2O_3$), vanadium tetraoxide ($V_2O_4$), vanadium pentoxide ($V_2O_5$), and mixtures thereof.

7. The process of claim 5 wherein said halide is palladium dichloride.

8. The process of claim 7 wherein said oxygen-containing sulfur compound is diphenyl sulfone.

9. The process of claim 5 wherein said halide is rhodium trichloride.

10. The process of claim 9 wherein said oxygen-containing sulfur compound is dimethyl sulfoxide.

11. The process of claim 9 wherein said oxygen-containing sulfur compound is tetramethylene sulfoxide.

12. The process of claim 9 wherein said oxygen-containing sulfur compound is dimethyl sulfone.

13. The process of claim 9 wherein said oxyegn-containing sulfur compound is diphenyl sulfone.

14. The process of claim 9 wherein said oxygen-containing sulfur compound is dibenzothiophene sulfone.

References Cited

UNITED STATES PATENTS

| | | | |
|---|---|---|---|
| 3,070,618 | 12/1962 | Smith | 260—453 A |
| 3,281,445 | 10/1966 | Manning et al. | 260—453 A |
| 3,405,156 | 10/1968 | Stern et al. | 260—453 |
| 3,461,149 | 8/1969 | Hardy et al. | 260—453 |
| 3,523,965 | 8/1970 | Kober et al. | 260—453 |
| 3,523,966 | 8/1970 | Ottmann et al. | 260—453 |

FOREIGN PATENTS

| | | | |
|---|---|---|---|
| 1,025,436 | 4/1966 | Great Britain | 260—453 A |

HENRY R. JILES, Primary Examiner

D. H. TORRENCE, Assistant Examiner

U.S. Cl. X.R.

252—429, 430, 439